(12) United States Patent
Silvano de Sousa et al.

(10) Patent No.: US 10,897,308 B2
(45) Date of Patent: Jan. 19, 2021

(54) INTEGRATION OF ALL COMPONENTS BEING NECESSARY FOR TRANSMITTING/RECEIVING ELECTROMAGNETIC RADIATION IN A COMPONENT CARRIER

(71) Applicant: AT&S Austria Technologie & Systemtechnik Aktiengesellschaft, Leoben (AT)

(72) Inventors: Jonathan Silvano de Sousa, Vienna (AT); Gernot Grober, Allerheiligen (AT)

(73) Assignee: AT&S Austria Technologie & Systemtechnik Aktiengesellschaft, Leoben (AT)

( * ) Notice: Subject to any disclaimer, the term of this patent is extended or adjusted under 35 U.S.C. 154(b) by 0 days.

(21) Appl. No.: 16/660,652

(22) Filed: Oct. 22, 2019

(65) Prior Publication Data
US 2020/0153510 A1    May 14, 2020

(30) Foreign Application Priority Data
Oct. 29, 2018 (EP) .................................. 18203217

(51) Int. Cl.
*H04B 10/00* (2013.01)
*H04B 10/25* (2013.01)
*H04B 10/2575* (2013.01)

(52) U.S. Cl.
CPC ......... *H04B 10/25* (2013.01); *H04B 10/2575* (2013.01)

(58) Field of Classification Search
CPC .... H04B 10/40; H04B 10/505; H04B 10/506; H04B 10/541; H04B 10/503;
(Continued)

(56) References Cited

U.S. PATENT DOCUMENTS 6,527,458 B2 * 3/2003 Kim ..................... G02B 6/4246
                                                           385/89
8,708,901 B2    4/2014 Ahn
(Continued)

FOREIGN PATENT DOCUMENTS

CN    101162800 A    4/2008
CN    102480062 A    5/2012
(Continued)

OTHER PUBLICATIONS

Extended European Search Report, Application No. 18203217.7, Apr. 30, 2019, pp. 1-11, European Patent Office, Munich, Germany.
(Continued)

*Primary Examiner* — Hanh Phan
(74) *Attorney, Agent, or Firm* — Robert A. Blaha; Smith Tempel Blaha LLC (57) ABSTRACT

An electronic device and a method for transmitting electromagnetic radiation are disclosed. The electronic device includes (a) a component carrier with a stack having at least one electrically insulating layer structure and/or at least one electrically conductive layer structure; (b) a component embedded in the component carrier and configured for providing an electric radio frequency signal; (c) an antenna structure formed in the component carrier and configured for emitting electromagnetic radiation in response to receiving the provided electric radio frequency signal; and (d) a radiation lens formed in the component carrier and configured for spatially manipulating the emitted electromagnetic radiation and directing the spatially manipulated emitted electromagnetic radiation to an environment of the component carrier. Further described is an electronic device and a method for receiving electromagnetic radiation.

19 Claims, 2 Drawing Sheets

(58) Field of Classification Search
CPC .......... H04B 10/2575; H04B 10/25752; H04B 10/25753; G02B 6/4246; G02B 6/428; G02B 6/4279; G02B 6/6257
USPC ....... 398/135, 136, 137, 138, 139, 158, 159, 398/183, 182, 192, 193, 194, 118, 119, 398/115, 128, 130, 129, 131, 164, 116, 398/117; 385/88, 89, 90, 92, 93
See application file for complete search history.

(56) References Cited

U.S. PATENT DOCUMENTS

| | | | |
|---|---|---|---|
| 8,860,607 | B2 | 10/2014 | Shamim et al. |
| 9,749,054 | B2 * | 8/2017 | Ben Ezra ................. G02F 1/015 |
| 2004/0040764 | A1 | 3/2004 | Polak |
| 2006/0028385 | A1 | 2/2006 | Davis et al. |
| 2008/0169125 | A1 | 7/2008 | Hsu et al. |
| 2010/0033389 | A1 | 2/2010 | Yonak et al. |
| 2012/0032836 | A1 | 2/2012 | Shamim et al. |
| 2014/0110841 | A1 | 4/2014 | Beer et al. |
| 2017/0229783 | A1 | 8/2017 | Liu et al. |

FOREIGN PATENT DOCUMENTS

| | | | |
|---|---|---|---|
| CN | 102832459 | A | 12/2012 |
| CN | 103414029 | A | 11/2013 |
| CN | 203674385 | U | 6/2014 |
| EP | 3 031 493 | A1 | 6/2016 |
| FR | 2803694 | A1 | 7/2001 |
| GB | 2 381 952 | A | 5/2003 |
| GB | 2 529 211 | A | 2/2016 |
| JP | 5770876 | B1 | 8/2015 |
| KR | 101003014 | B1 | 12/2010 |
| WO | 2004088793 | A1 | 10/2004 |
| WO | 2010016799 | A1 | 2/2010 |
| WO | 2010105109 | A2 | 9/2010 |
| WO | 2011159262 | A1 | 12/2011 |
| WO | 2013011965 | A1 | 1/2013 |
| WO | 2013072844 | A1 | 5/2013 |
| WO | 2013169708 | A1 | 11/2013 |
| WO | 2014027322 | A2 | 2/2014 |
| WO | 2015088214 | A1 | 6/2015 |
| WO | 2017049476 | A1 | 3/2017 |

OTHER PUBLICATIONS

Freire, Manuel J.: "MRI & Metamaterials", Feb. 15, 2018. http://personal.us.es/Freire/MRI.htm.

University of Oxford: Metamaterials Research in Oxford, Feb. 15, 2018, http://www.eng.ox.ac.uk/communications/research/metamaterials.

Wikipedia, Metamaterial antenna, https://en.wikipedia.org/w/index.php?title=Metamaterial_antenna&oldid=822483407, Jan. 26, 2018.

Kohler, Jan et al., Annual Report 2017: WISDOM—Wideband Low-Cost Smart Passive and Active Integrated Antennas for THz Wireless Communications.

Mei Jiang et al: "Metamaterial-Based Thin Planar Lens Antenna for Spatial Beamforming and Multibeam Massive MIMO", IEEE Transactions on Antennas and Propagation., vol. 65, No. 2, Feb. 2, 2017 (Feb. 2, 2017), pp. 464-472, XP055581902, US ISSN: 0018-926X, DOI: 10.1109/TAP.2016.2631589.

English Translation of First Office Action in Application No. 201911029593.3; The China Intellectual Property Administration; dated Oct. 22, 2020; pp. 1-3; Haidian District, 100088, Beijing, China.

First Office Action in Application No. 201911029593.3; The China Intellectual Property Administration; dated Oct. 22, 2020; pp. 1-13; Haidian District, 100088, Beijing, China.

Sakakibara, K. et al.; Design of 2D Rotman-lens Multi-beam Antenna Using Multi-layer Substrate Integrated Waveguide, 2018 IEEE MTT-S International Conference on Microwaves for Intelligent Mobility (ICMIM); pp. 1-4; Apr. 15-17, 2018, IEEE; downloaded on Nov. 18, 2020 from IEEE Explore.

Dhouibi, A. et al.; Compact Metamaterial-Based Substrate-Integrated Luneburg Lens Antenna; IEEE Antennas and Wireless Propagation Letters; vol. 11, 2012; pp. 1504-1507; Dec. 11, 2012; IEEE; downloaded on Nov. 18, 2020 from IEEE Explore.

* cited by examiner

INTEGRATION OF ALL COMPONENTS BEING NECESSARY FOR TRANSMITTING/RECEIVING ELECTROMAGNETIC RADIATION IN A COMPONENT CARRIER

CROSS-REFERENCE TO RELATED APPLICATION

This application claims the benefit of the filing date of European Patent Application No. EP 18203217.7 filed Oct. 29, 2018, the disclosure of which is hereby incorporated herein by reference.

TECHNICAL FIELD

Embodiments of the invention generally relate to the technical field of communication devices. Specifically, embodiments of the invention relate to electronic devices comprising a component carrier such as a printed circuit board and elements being used for a transmission respectively for a reception of electromagnetic radiation.

TECHNOLOGICAL BACKGROUND

Wireless communication is typically realized by means of electromagnetic radiation. The spectral range, i.e. the wavelength respectively the frequency, of the employed electromagnetic radiation depends on the specific application. Widely used spectral ranges are for instance (i) the (optical) infrared spectral range with wavelengths between e.g. several μm ($=10^{-6}$m) and 750 nm and (ii) the radio frequency range with frequencies between e.g. 100 kHz and 5 GHz. Just as an example, radio frequency transponders or near field communication applications use frequencies close to 13.56 MHz, mobile phones may use frequencies in the range between 900 MHz and 2.6 GHz.

For transmitting as well as for receiving electromagnetic radiation in the radio frequency range antennas are necessary. The radiation being emitted by antennas is diffuse and the resulting power density of the generated electro-magnetic field decays inversely proportionally to the square with the distance between a receiving antenna and a transmitting antenna. Even when employing antenna structures producing a spatially directed or focused transmission of electromagnetic radiation, e.g. focused beam applications being used in the 5G telecommunication standard, this diffusive property results in that the generated signal strength can be very weak at relatively large distances. Hence, more energy is needed to generate higher power signals in order to reach targets far from the (transmitting) antenna. Further, the amount of transmitted data can be impacted since the quantity of information packages successfully transferred by an electromagnetic radiation impulse generated by an antenna depends on the signal strength at a given distance.

In order to focus electromagnetic radiation, one lens or an array of lenses may be employed. In particular, for small communication devices it is known to use metamaterials for building up a so-called metamaterial antenna. A metamaterial antenna can be realized with metallic structures in diverse geometries, depending on the employed wavelength and the specific application.

The Annual Report 2017 "WISDOM—Wideband Low-Cost Smart Passive and Active Integrated Antennas for THz Wireless Communications" by the authors Jan Köhler, Michael E. Gadringer, and Wolfgang Bösch, Institute of Microwave and Photonic Engineering, Graz University of Technology, Graz, Austria proposes an electronic package housing a chip and an antenna being connected with each other. The chip (i) electrically drives the antenna and/or (ii) receives and processes electric signals received by the antenna. A lens made from a metamaterial geometric structure is directly attached at a surface of the electronic package for focusing electromagnetic radiation. The proposed electronic package with the attached electromagnetic radiation lens has the drawback that for manufacturing the same a plurality of process steps are required.

SUMMARY

There may be a need for providing an electronic communication device, which on the one hand can be realized in a compact design and on the other hand can be manufactured easily.

This need may be met by the subject matter according to the independent claims. Advantageous embodiments of the present invention are described by the dependent claims.

According to a first aspect there is provided an electronic device for transmitting electromagnetic radiation. The provided electronic device comprises (a) a component carrier comprising a stack having at least one electrically insulating layer structure and/or at least one electrically conductive layer structure; (b) a component configured for providing an electric radio frequency signal; (c) an antenna structure formed in the component carrier and configured for emitting electromagnetic radiation in response to receiving the provided radio frequency signal; and (d) a radiation lens formed in the component carrier and configured for spatially manipulating the emitted electromagnetic radiation and directing the spatially manipulated emitted electromagnetic radiation to an environment of the component carrier.

According to a further aspect there is provided an electronic device for receiving electromagnetic radiation. The provided electronic device comprises (a) a component carrier comprising a stack having at least one electrically insulating layer structure and/or at least one electrically conductive layer structure; (b) a radiation lens formed in the component carrier and configured for spatially manipulating electromagnetic radiation originating from an environment of the component carrier; (c) an antenna structure formed in the component carrier and configured for receiving the spatially manipulated electromagnetic radiation and for providing an electric radio frequency signal in response to the received spatially manipulated electromagnetic radiation; and (d) a component configured for receiving and processing the electric radio frequency signal.

According to a further aspect there is provided an electronic apparatus comprising (a) an electronic device as described above for transmitting electromagnetic radiation and (b) an electronic device as described above for receiving electromagnetic radiation.

According to a further aspect there is provided a method for transmitting electromagnetic radiation by means of an electronic device, in particular by means of a (transmitting) electronic device for transmitting electromagnetic radiation as described above. The provided method comprises (a) providing an electric radio frequency signal by a component, wherein the component carrier comprises a stack having at least one electrically insulating layer structure and/or at least one electrically conductive layer structure; (b) receiving the radio frequency signal by an antenna structure formed in the component carrier; (c) emitting electromagnetic radiation with the antenna structure in response to the received radio frequency signal; and (d) spatially manipulating the emitted electromagnetic radiation with a radiation lens formed in the component carrier and directing the spatially manipulated emitted electromagnetic radiation to an environment of the component carrier.

Still further there is provided a method for receiving electromagnetic radiation by an electronic device. The method comprises (a) spatially manipulating electromagnetic radiation originating from an environment of the component carrier, by a radiation lens formed in a component carrier, wherein the component carrier comprises a stack having at least one electrically insulating layer structure and/or at least one electrically conductive layer structure; (b) receiving the spatially manipulated electromagnetic radiation by an antenna structure formed in the component carrier; (c) providing, by the antenna structure, an electric radio frequency signal in response to the received spatially manipulated electromagnetic radiation; and (d) receiving and processing, by a component, the electric radio frequency signal.

Overview of Embodiments

In the context of this document, the term "component carrier" may denote any support structure, which is capable of accommodating one or more (electronic) components thereon and/or therein for providing mechanical support and/or electrical connectivity. In other words, the component carrier may be configured as a mechanical and/or electric carrier for components. Electrical conductivity is provided by conductor paths, which may be formed at the surface of the component and/or within inner structured electrically conductive layers of the component carrier being realized as a so-called multilayer component carrier. Also, the described antenna structure and/or the radiation lens may be realized by means of appropriately structured electrically conductive layers of the component carrier stack. In particular, the component carrier may be a Printed Circuit Board (PCB).

The component carrier may be a laminate of the mentioned electrically insulating layer structure(s) and electrically conductive layer structure(s), in particular formed by applying mechanical pressure, if desired supported by thermal energy. The mentioned stack may provide a plate-shaped component carrier being capable of providing a large mounting surface for further components and being nevertheless very thin and compact. The term "layer structure" may in particular denote a continuous layer, a patterned layer or a plurality of non-consecutive islands within a common plane.

In an embodiment, the component carrier is shaped as a plate. This contributes to a compact design, wherein the component carrier nevertheless provides a large basis for mounting (surface mount device, SMD) components thereon. Furthermore, in particular a naked die as an example for an embedded electronic component, can be conveniently embedded, thanks to its small thickness, into a thin plate representing e.g. a PCB.

In this document the term "Printed Circuit Board" (PCB) may particularly denote a component carrier which is formed by laminating several electrically conductive layer structures with at least one electrically insulating layer structure, for instance by applying pressure, if desired accompanied by the supply of thermal energy. A PCB may be plate-shaped (i.e. planar), three-dimensionally curved (for instance when manufactured using 3D printing) or may have any other shape. As preferred materials for PCB technology, the electrically conductive layer structures are made of copper, whereas the electrically insulating layer structures may comprise resin and/or glass fibers, so-called prepreg material or, after curing, FR4 material. The various electrically conductive layer structures may be connected to one another in a desired way by forming through-holes through the laminate, for instance by laser drilling or mechanical drilling, and by filling them with electrically conductive material such as in particular copper, thereby forming vias as through-hole connections. Alternatively, at least some via connections may be realized by means of blind vias. Apart from one or more (electronic) components which may be embedded, a PCB is usually configured for accommodating one or more SMD components on one or both opposing surfaces of the plate-shaped PCB. They may be connected to the respective main surface by soldering. A dielectric part of a PCB may be composed of resin with reinforcing fibers such as e.g. glass fibers.

The described at least one electrically insulating layer structure may comprise at least one of the group consisting of resin (such as reinforced or non-reinforced resins, for instance epoxy resin or Bismaleimide-Triazine resin, more specifically FR-4 or FR-5), cyanate ester, polyphenylene derivate, glass (in particular glass fibers, multi-layer glass, glass-spheres, glass-like materials), prepreg material, photo-imageable dielectric material, polyimide, polyamide, liquid crystal polymer (LCP), epoxy-based Build-Up Film, polytetrafluoroethylene)(Teflon®, a ceramic, and a metal oxide. Teflon® is a registered trademark of the Chemours Company FC, LLC of Wilmington, Dela., U.S.A. Reinforcing materials such as webs, fibers or spheres, for example made of glass (multilayer glass) may be used as well. Although prepreg, or FR4, epoxy-based Build-Up Film or photo-imageable dielectrics are usually preferred, other materials may be used as well. For high frequency applications, high-frequency materials such as polytetrafluoroethylene, liquid crystal polymer and/or cyanate ester resins may be implemented in the component carrier as electrically insulating layer structure.

The at least one electrically conductive layer structure may comprise at least one of the group consisting of copper, aluminum, nickel, silver, gold, palladium, and tungsten. Although copper is usually preferred, other materials or coated versions thereof are possible as well, in particular coated with supra-conductive material such as graphene.

Apart from the embedded component, which, in operation, provides the radio-frequency signal, one or more further components can be mounted on and/or accommodated within the component carrier. Such a further component can be selected from a group consisting of an electrically non-conductive inlay, an electrically conductive inlay (such as a metal inlay, preferably comprising copper or aluminum), a heat transfer unit (for example a heat pipe), an electronic component, or combinations thereof. For example, the component can be an active electronic component, a passive electronic component, an electronic chip, a storage device (for instance a DRAM or another data memory), a filter, an integrated circuit, a signal processing component, a power management component, an optoelectronic interface element, a voltage converter (for example a DC/DC converter or an AC/DC converter), a cryptographic component, a transmitter and/or receiver, an electromechanical transducer, a sensor, an actuator, a microelectromechanical system (MEMS), a microprocessor, a capacitor, a resistor, an inductance, a battery, a switch, a camera, an antenna, a logic chip, and an energy harvesting unit. However, other components may be embedded in the component carrier. For example, a magnetic element can be used as a component. Such a magnetic element may be a permanent magnetic element (such as a ferromagnetic element, an antiferromagnetic element or a ferrimagnetic element, for instance a ferrite core) or may be a paramagnetic element. However, the component may also be a further component carrier, for example in a board-in-board configuration. The component may be surface mounted on the component carrier and/or may be embedded in an interior thereof. Moreover, also other components, in particular those which generate and emit electromagnetic radiation and/or are sensitive with regard to electromagnetic radiation propagating from an environment, may be used as component.

The described (transmitting) electronic device for transmitting electromagnetic radiation is based on the idea that all elements/components being necessary (i) for generating electromagnetic radiation and (ii) for spatially manipulating the generated electromagnetic radiation can be embedded within the component carrier. This allows for realizing the electronic device in a compact manner and/or with a high robustness in particular with regard to collecting dust and/or mechanical impacts such as vibrations. Further, integrating all necessary components within the component carrier may allow for realizing/manufacturing the described electronic device in a cost-effective manner.

The component (for driving the antenna structure) may also be embedded in the component carrier. Alternatively, the component may be located external to the component carrier and connected to the antenna structure with an appropriate electric wiring.

With the described spatial manipulation, the radiation pattern of the emitted electromagnetic radiation may be modified towards a desired spatial radiant exitance. In this context the radiation lens may be preferably configured for focusing the emitted electromagnetic radiation in order increase the radiation intensity at a specific spot. However, in some applications also an intentional spatial widening of the emitted electromagnetic radiation may be performed by means of the radiation lens such that the emitted electromagnetic radiation is directed into a predefined angular solid range. However, in order to realize an intensity enhancement, the radiation lens may be configured for focusing the emitted electromagnetic radiation towards one or, in some applications, more than one focal spot.

According to an embodiment the radiation lens is configured for spatially concentrating the emitted electromagnetic radiation towards a (transmitting) focal spot being located outside from the component carrier. This may provide the advantage that the electronic device can communicate, as a transmitter, with another electronic device being realized as a receiver. Thereby, in order to achieve a good signal quality even with a limited amount of consumed power being needed for the entire communication and in particular for the generation of the electromagnetic radiation, the receiving electronic device or more precisely a (receiving) focal spot of the receiving electronic device may be located close to the described (transmitting) focal spot of the transmitting electronic device. The (receiving) focal spot of the receiving electronic device may spatially match with an antenna of the receiving electronic device. Alternatively, the (receiving) focal spot of the receiving electronic device may be spatially defined with the imaging property of a (receiving) radiation lens imaging respectively mapping the (receiving) focal spot to the antenna of the receiving electronic device.

The described (receiving) electronic device for receiving electromagnetic radiation is based on the idea that all elements/components being necessary (i) for spatially manipulating electromagnetic radiation originating from an environment of the component carrier and (ii) for receiving and optionally also for further processing the spatially manipulated electromagnetic radiation can be embedded within a component carrier. This allows for realizing the electronic device in a compact manner and/or with a high robustness in particular with regard to collecting dust and/or mechanical impacts such as vibrations. Further, integrating all necessary elements within the component carrier may allow for realizing/manufacturing the described electronic device in a cost-effective manner.

The component (for receiving the electrical signal from the antenna structure) may also be embedded in the component carrier. Alternatively, the component may be located external to the component carrier and connected to the antenna structure with an appropriate electric wiring.

With the described spatial manipulation of the electromagnetic radiation electromagnetic radiation may be collected from one direction or from more than one direction from the environment or from the exterior of the component carrier and the collected electromagnetic radiation may be directed to the antenna structure.

In this context the radiation lens may be preferably configured for focusing the electromagnetic radiation received from the environment of the component carrier to the antenna structure. By this way, external electromagnetic radiation may be collected with a high efficiency. Thereby, the external electromagnetic radiation may be collected from one direction, from more than one discrete direction, or from a predefined angular solid range. However, in order to realize an intensity enhancement, the radiation lens may be configured for focusing the electromagnetic radiation emitted from a particular one or from more than one particular transmitting electronic device onto the (embedded) antenna structure.

According to a further embodiment the radiation lens is configured for spatially concentrating the electromagnetic radiation originating from the environment of the component carrier towards a (receiving) focal spot being located inside of the component carrier. This may provide the advantage that the electronic device can communicate, as a receiver, with another electronic device being realized as a transmitter/transmitting electronic device. The location of the (receiving) focal spot inside the component carrier may preferably correspond to the location of the antenna structure in order to achieve a good signal quality even with a limited amount of power being needed for the entire communication and in particular for the generation of the electromagnetic radiation by the transmitting electronic device. Descriptively speaking, for an efficient communication the radiation lens collects electromagnetic radiation originating from an environment of the component carrier and focusses the collected electromagnetic radiation to the antenna structure.

According to a further embodiment the component, the antenna structure, and the radiation lens are formed within one and the same component carrier. Integrating all element/components which are required (i) for emitting electromagnetic radiation to the environment of the (only one) component carrier respectively (ii) for receiving electromagnetic radiation originating from the environment of the (only one) component carrier may provide the advantage that the electronic device can be realized in a particular compact manner and/or with a particular cost-effective manufacturing process.

According to a further embodiment the radiation lens comprises a metamaterial, in particular a metamaterial having a negative relative dielectric constant ($\varepsilon<0$). This may provide the advantage that the properties of the radiation lens with respect to a spatial propagation of the radiation leaving the lens can be tailored/optimized for many different applications. Further, an integration of the radiation lens into the component carrier can be easily facilitated because materials, which can be used for building up the component carrier, can also be employed for realizing the metamaterial of the radiation lens.

In this context a metamaterial can be considered as to be a passive structure consisting of or comprising multiple small electrical objects, which combine multiple electromagnetic characteristics such as transformation, reflection, and/or transmission in order to tailor electromagnetic characters to different properties. The unconventional structures in metamaterials are featuring backward propagation, negative permittivity and permeability. Metamaterials can be defined as a superset of artificial dielectrics with electromagnetic properties, including those that are inaccessible in nature or are difficult to obtain. Perhaps the most representative metamaterial is the so called left-handed (LH) one (also known as a "negative-refractive-index (NRI)" or a "double negative" medium), which is characterized by a simultaneously negative permittivity and permeability, thus implying a negative index of refraction. A combination of multiple small elements is capable of directing and/or focusing the radiation properties.

According to a further embodiment the radiation lens is realized with materials of different layers of the stack of the component carrier. This may further facilitate the integration of the radiation lens within the component carrier.

According to a further embodiment the radiation lens comprises stacked rings made of an electrically conductive material, wherein in between two neighboring stacked rings there is provided a dielectric material. This may provide the advantage that for the radiation lens a highly effective structure (with regard to the capability of spatially manipulating electromagnetic radiation) can be realized in a comparatively simple manner. Thereby, the described electrically conductive material can be a material "taken from" the at least one electrically conductive layer structure of the stack of the component carrier. Alternatively or in combination, the dielectric material can be "taken from" the at least one electrically insulating layer structure of the stack.

According to a further embodiment there is formed a cavity within the component carrier. The cavity is located in a path of the electromagnetic radiation, which path extends between the antenna structure and the radiation lens.

The electromagnetic radiation may interact with the cavity in such a manner that, depending on the specific configuration, the cavity acts as a waveguide, which spatially guides the electromagnetic radiation between the antenna structure and the radiation lens. Thereby, the cavity contributes to a spatial confinement or a focusing of the electromagnetic radiation already within the component carrier. Alternatively or in combination, the described cavity may act as a resonance cavity which yields a wavelength selection and/or an amplification (in a fashion similar to an acoustic guitar). The resonance cavity may be e.g. a Helmholtz cavity.

The cavity may be an empty cavity, i.e. a cavity filled with air. In this context the (side)walls of the cavity represent a border/interface between different materials which exhibit different indexes of refraction for the electromagnetic radiation. Alternatively, the cavity may be filled with a material having a refractive index being different to the refractive index of the material of (the stack of) the component carrier which surrounds the cavity. In this case the refractive index of the (filling) material of the cavity should differ from the refractive index of the at least one electrically insulating structure and/or of the at least one electrically conductive layer structure.

According to a further embodiment the antenna structure is provided directly at the component. This may provide the advantage that it is not necessary to form a wiring structure electrically connecting the component with the antenna structure. This further facilitates the process of manufacturing the described electronic device.

In case the component is a semiconductor die/chip the antenna structure may be provided directly at the surface of the die. Alternatively, the antenna structure may be realized with a semiconductor process at or within a portion of a body of the semiconductor die, which portion is close to the surface of the die.

In case the component is a packaged (semiconductor) component, the antenna structure may be provided directly at an outer surface of the respective package. Alternatively, both the component and the antenna structure may be packaged together with an appropriate package structure.

According to a further embodiment the antenna structure is spatially separated from the component and is electrically connected via an electrically conductive wiring structure formed within the component carrier. This may provide the advantage that when designing the electronic device in order to meet or comply with certain electric and/or electromagnetic specifications the relative spatial arrangement of the component and the antenna structure within the component carrier can be chosen with a high degree of freedom. This facilitates finding an appropriate design for a variety of different specific applications.

The electrically conductive wiring structure can be realized by means of (metallized) vias and/or conductor traces, which are structured or patterned from at least one electrically conductive layer structure of the stack in an appropriate manner.

According to a further embodiment the electromagnetic radiation is transferred between the environment of the component carrier and the component carrier via a side surface of the component carrier. Alternatively, the electromagnetic radiation is transferred between the environment of the component carrier and the component carrier via a main surface of the component carrier.

Transferring the electromagnetic radiation via a side surface of the component carrier may provide the advantage that the electromagnetic radiation is propagating within a plane being at least approximately parallel with the various layer structures of the stack of the component carrier. This may be of benefit in case different electronic devices, which are supposed to communicate with each other via the electromagnetic radiation, are mounted or should be mounted at a common support. The common support may be for instance a larger component carrier such as a so-called mother PCB.

For the sake of clarity, it is pointed out that in this document the term "side surface" of the component carrier is a surface of the component carrier which surface is oriented perpendicular to the main surfaces of the various layer structures of the stack of the component carrier. Thereby, the term "main surface" refers to a surface which is oriented parallel with the planes (and perpendicular to the normal vector of the planes) being defined by the length and the width (and not by the thickness) direction of the various layers or layer structures of the stack of the component carrier.

Transferring the electromagnetic radiation via a main surface of the component carrier may provide the advantage that the described electronic device can also be applied for applications where electromagnetic radiation is supposed to propagate perpendicular to the main surface of the component carrier. This increases the area of potential applications for the described electronic device.

According to a further embodiment the electronic device further comprises a radiation reflector formed in the component carrier and configured for redirecting electromagnetic radiation propagating inside the component carrier.

The described (electromagnetic) radiation reflector may provide the advantage that the spatial course of the propagation path of the electromagnetic radiation (already) within the component carrier can be easily designed in a desired/application specific manner. In particular, with the help of an appropriate reflector the orientation of elements/components of the described electronic device being involved in the "electromagnetic radiation" can be freely chosen. Also, the direction for transmitting and/or receiving the electromagnetic radiation with regard to the planes of the stack can be freely chosen when designing the described electronic device.

The reflector may be oriented such that a redirection/deflection of the electromagnetic radiation takes place with any desired angle between 0° (0 degree) and 180°. However, for the benefit of a simple and easy to realize structure of the electronic device the reflector may be oriented with an angle of 45° with regard to the planes of the stack and the deflection angle may be at least approximately 90°.

Of course, also more than one radiation reflector can be provided in order to redirect the electromagnetic radiation (already) within the component carrier several times.

The described electronic apparatus is based on the idea that the above described electronic device for transmitting electromagnetic radiation and the above described electronic device for receiving electromagnetic radiation can be integrated within one apparatus having a transmit (Tx) and a receive (Rx) capability. Hence, the described electronic apparatus may represent a full communication device being capable of participating in a bi-directional communication.

Integrating both electronic devices within one apparatus and preferably within one housing may provide the advantage that the electronic apparatus can be realized in spatially compact way. Thereby, benefit can be taken from the matter of fact that the signals paths within the apparatus can be kept short.

It is mentioned that alternatively or in combination the two electronic devices can act as a transceiver, wherein the device for receiving electromagnetic radiation receives this electromagnetic radiation from a first entity and the device for transmitting electromagnetic radiation transmits this electromagnetic radiation to a second entity. In this way a typical transceiver configuration can be realized. Again, benefit can be taken from short signals paths within the apparatus leading to an efficient communication.

The described method is based on the idea that electromagnetic radiation can be transmitted by means of an easy and cost effective fabricable electronic device which comprises or consists of a component carrier such as a PCB. All elements/components being necessary (i) for generating the electromagnetic radiation and (ii) for spatially manipulating the generated electromagnetic radiation are embedded within the component carrier.

According to a further aspect there is provided a method for receiving electromagnetic radiation by means of an electronic device, in particular by means of a (receiving) electronic device for receiving electromagnetic radiation as described above. The provided method comprises (a) by means of a radiation lens formed in a component carrier, spatially manipulating electromagnetic radiation originating from an environment of the component carrier, wherein the component carrier comprises a stack having at least one electrically insulating layer structure and/or at least one electrically conductive layer structure; (b) receiving the spatially manipulated electromagnetic radiation by means of an antenna structure formed in the component carrier; (c) providing, by means of the antenna structure, an electric radio frequency signal in response to the received spatially manipulated electromagnetic radiation; and (d) receiving and processing, by means of a component, the electric radio frequency signal.

The described method is based on the idea that electromagnetic radiation can be received and, in order to extract pieces of information, processed by means of an easy and cost effective fabricable electronic device, which comprises or consists of a component carrier such as a PCB. All elements/components being necessary (i) for spatially manipulating electromagnetic radiation originating from an environment of the component carrier and (ii) for receiving and optionally for further processing the spatially manipulated electromagnetic radiation are embedded within the component carrier.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims, is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION OF ILLUSTRATED EMBODIMENTS

The illustrations in the drawings are schematically presented. It is noted that in different figures, similar or identical elements or features are provided with the same reference signs or with reference signs, which are different from the corresponding reference signs only within the first digit. In order to avoid unnecessary repetitions elements or features, which have already been elucidated with respect to a previously described embodiment, are not elucidated again at a later position of the description.

Further, spatially relative terms, such as "front" and "back", "above" and "below", "left" and "right", et cetera are used to describe an element's relationship to another element or elements as illustrated in the Figures. Thus, the spatially relative terms may apply to orientations in use, which differ from the orientation depicted in the Figures. Obviously, all such spatially relative terms refer to the orientation shown in the Figures only for ease of description and are not necessarily limiting as an apparatus according to an embodiment of the invention can assume orientations different than those illustrated in the Figures when in use.

Figure 1:
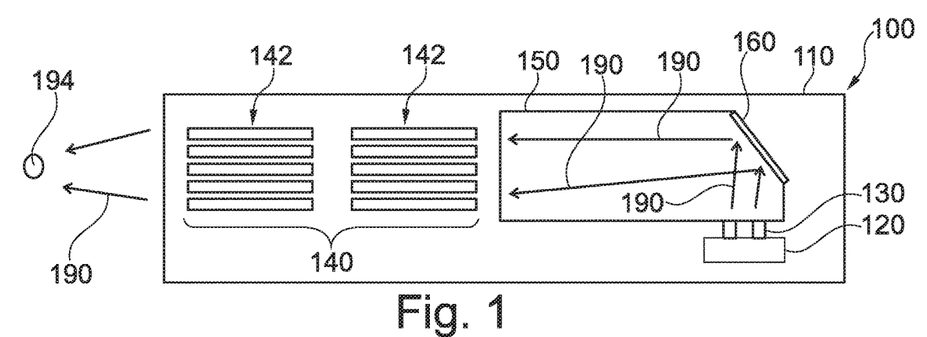
FIG. 1 shows a transmitting electronic device comprising a multilayer component carrier embedding all elements being necessary for transmitting electromagnetic radiation in an in-plane direction parallel to main surfaces of layers of the component carrier.

FIG. 1 shows a transmitting electronic device 100 in accordance with an embodiment. The electronic device 100 comprises a multilayer component carrier 110. Within the component carrier 110 there are embedded all elements being necessary for transmitting electromagnetic radiation in an in-plane direction. Thereby, the in-plane direction is a direction being parallel to the main surfaces of layers of a stack of the multilayer component carrier 110.

A first embedded element is an electronic component 120, which drives an antenna structure 130 in order to emit electromagnetic radiation 190. In the embodiment described here the antenna structure 130 is mounted at an upper surface of the component 120.

The electromagnetic radiation 190 emitted by the antenna structure 130 is directed towards a reflector 160, which is formed at an angled inner side wall of a cavity. As can be taken from FIG. 1, the reflector 160 causes that the electromagnetic radiation 190 is redirected by approximately 90° such that the reflected electromagnetic radiation 190 propagates substantially parallel to (the main surfaces of) the layers of the component carrier 110.

The reflector 160 may be realized by means of a metallic layer (e.g. copper or aluminum), which acts as a mirror for the electromagnetic radiation 190.

The cavity 150 comprises spatial dimensions, which are adapted to the wavelength of the electromagnetic radiation 190. Specifically, the propagation length of the electromagnetic radiation within the cavity 150 is such that the cavity 150 is a resonator, which provides for an amplification of the electromagnetic radiation signal (similar to the resonator of an acoustic guitar).

It is pointed out that the cavity may be empty ("vacuum"). However, the cavity may also be filled with a dielectric material (e.g. resin) having an appropriate dielectric constant or any gas like air or Xenon.

As can be further taken from FIG. 1, the electromagnetic radiation 190 leaving the cavity 150 at its left side propagates though a region of the component carrier 110, within which a radiation lens 140 is build up. The radiation lens 140 comprises a stack 142 of metallic rings, wherein two neighboring metallic rings are separated from each other by an intermediate layer of an electrically insulating or dielectric material. The metallic rings together with the electrically insulating material form a so-called metamaterial lens. The geometric structure of the radiation lens 140 is such that the electromagnetic radiation 190 leaving the radiation lens 140 at the left surface of the component carrier 110 is focused towards a focal spot 194. The focal spot 194 is located outside from the component carrier 140.

According to the embodiment described here the multilayer structure of the component carrier 110 is exploited for realizing the radiation lens 140. Specifically, the stacked rings 142 are structured from electrically conductive or metallic layer structures of the multilayer component carrier 110 and the insulating material in between two neighboring rings is "taken from" the electrically insulating or dielectric layer structures of the multilayer component carrier 110. It is pointed out that in the cross-sectional view of FIG. 1 each ring of the stack 142 is illustrated by two horizontally neighboring rectangles.

It is mentioned that of course the radiation lens 140 can also be realized by a separate structure which, when building up the component carrier 110, is inserted into a recess of the component carrier 110. At the end of such a manufacturing process for the component carrier 110 this recess is preferably filled completely by this separate structure representing the radiation lens 140.

By integrating all elements being necessary for providing the focused electromagnetic radiation 190 within the component carrier 110 the electronic communication device 100 can be realized in a compact way and with a small number of mechanical assembly processes. Further, the electronic communication device 100 will also be characterized by a high operation reliability and a big constructional robustness.

Figure 2:
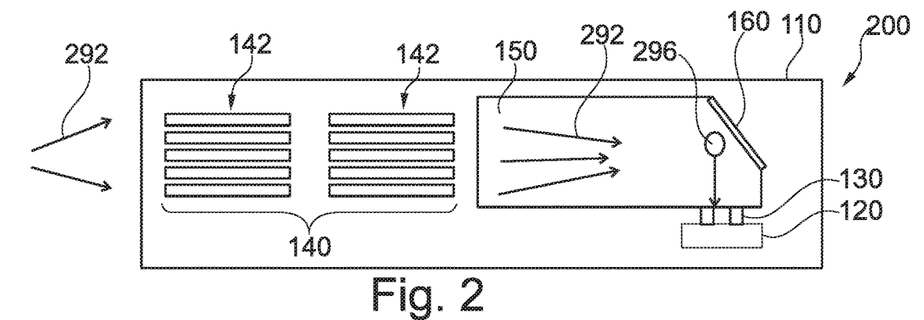
FIG. 2 shows a receiving electronic device comprising a multilayer component carrier embedding all elements being necessary for receiving electromagnetic radiation from an in-plane direction.

FIG. 2 shows a receiving electronic device 200, which also comprises a multilayer component carrier 110. All elements being necessary for receiving electromagnetic radiation 292 from the environment of the device 200 from a preferably in-plane direction are accommodated or embedded within the component carrier 110. As can be taken from FIG. 2, the divergent electromagnetic radiation 292 being collected by the electronic device 200 is focused by the radiation lens 142 towards a focal spot 296, which is located within the component carrier 110. In order to achieve a good sensitivity for the collected electromagnetic radiation 292 this focal spot 296 should be located within the cavity 150 and close to the antenna structure 130. In this case the component 120 could also be an energy harvesting module.

Figure 3:
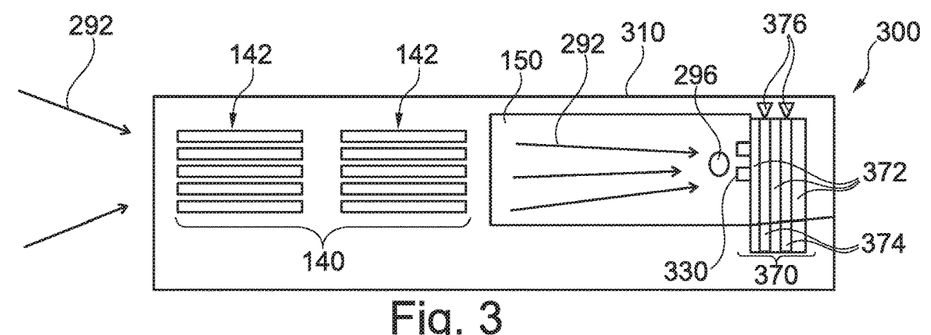
FIG. 3 shows a receiving electronic device with a multilayer component carrier embedding a printed circuit board in a 90° rotation, wherein an antenna structure is formed at the printed circuit board.

FIG. 3 shows a receiving electronic device 300 representing a modification of the receiving electronic device 200 shown in FIG. 2. The electronic device 300 comprises a multilayer component carrier 310 embedding a printed circuit board (PCB) device 370. The PCB device 370 also comprises a multilayer structure consisting of alternating electrically insulating layers 372 and electrically conductive layers 374. As can be taken from FIG. 3, compared to the orientation of the multilayer structure of the component carrier 310 the multilayer structure of the PCB device 370 is rotated by 90°.

An antenna structure 330 is formed at a front surface of the PCB device. In other non-depicted embodiments, the antenna structure 330 may be formed at least partially by at least one (structured) electrically conductive layer of the PCB device 372. Due to the orientation of the antenna structure 330 the preferred direction for receiving electromagnetic radiation 292 corresponds to the above specified in-plane direction. Again, a focal spot 296 is preferably located close to the antenna structure 330.

Further, electrical via connections 376 made e.g. from copper are provided in order to electrically connect the embedded PCB device 372 with non-depicted external circuitry. This external circuitry may comprise in particular a component receiving the electric signal from the antenna structure 330 and optionally for further processing this electric signal.

Figure 4:
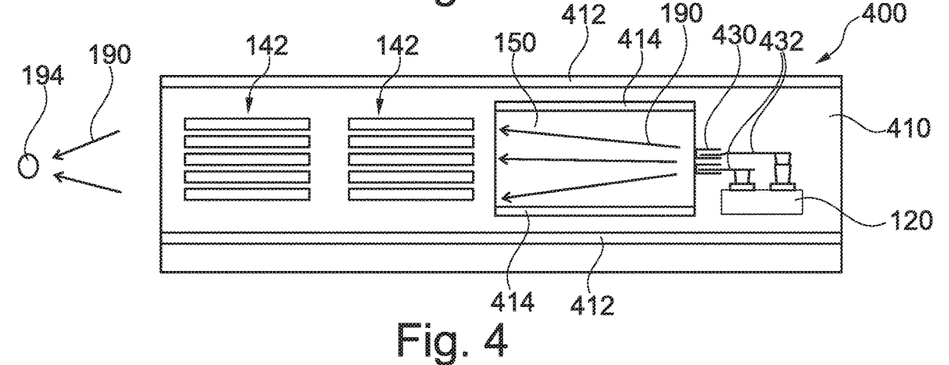
FIG. 4 shows a transmitting electronic device with a multilayer component carrier, wherein an antenna structure is build up with layers of the multilayer component carrier and shielding layers are provided.

FIG. 4 shows a transmitting electronic device 400 with a multilayer component carrier 410, wherein an antenna structure 430 is build up with structured layers of the multilayer component carrier 410. As can be taken from FIG. 4, according to the embodiment described here the antenna structure 430 is electrically connected with the component 120 by means of a wiring structure 432. The wiring structure 432 is also realized by appropriately structured electrically conductive layers of the multilayer component carrier 410 and by metallized vias (not denominated with reference numerals), which electrically connect layer portions being assigned to different (structured) electrically conductive layers of the multilayer component carrier 410.

Further, according to the embodiment described here shielding layers 412 and 414 are provided in order to shield the electronic device 400 and in particular the component 120 from external electromagnetic perturbations. As can be seen from FIG. 4, two shielding layers 414 are formed at the lower surface respectively at the upper surface of the cavity 150. Further, two further shielding layers 412 are formed at the upper surface of the component carrier 410 respectively within a lower portion of the component carrier 410. Preferably, the shielding layers 412, 414 are "taken from" electrically conductive layers of the multilayer component carrier 410.

Figure 5:
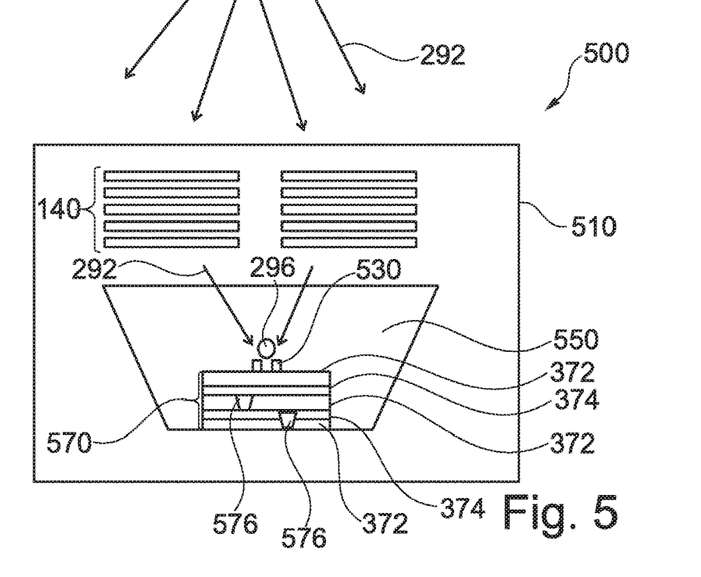
FIG. 5 shows a receiving electronic device for receiving electromagnetic radiation from an out-of-plane direction being perpendicular to main surfaces of layers of the component carrier.

FIG. 5 shows a receiving electronic device 500 for receiving electromagnetic radiation 292 from an out-of-plane direction. As has already been explained above, the out-of-plane direction is at least approximately perpendicular to the main surfaces of the layers of a multilayer component carrier 510 of the electronic device 500.

According to the embodiment described here an antenna structure 530 receiving electromagnetic radiation 292, which has been focused by means of a radiation lens 140, is realized with or formed at a PCB device 570. As can be seen from FIG. 5, the PCB device 570 is located within a cavity 550, which is formed below the radiation lens 140. Here, in the cross-sectional view of FIG. 5, the cavity has a trapezoidal shape. For electrically connecting the antenna structure 530 with a non-depicted component receiving the signal from the antenna structure, electrical via connections 576 are formed within the PCB device 570.

It is pointed out that the basic physical law of the reversibility of the optical path also applies to the electromagnetic radiation being transmitted or received by the embodiments elucidated above and illustrated in the FIGS. 1 to 5. Hence, all configurations shown and elucidated in this document as transmitting electronic devices (see FIGS. 1 and 4) can also be used for realizing a receiving device. The same holds true vice versa, all configurations shown and elucidated as receiving electronic devices (see FIGS. 2, 3, and 5) can also be used for realizing a transmitting device.

Figure 6A:
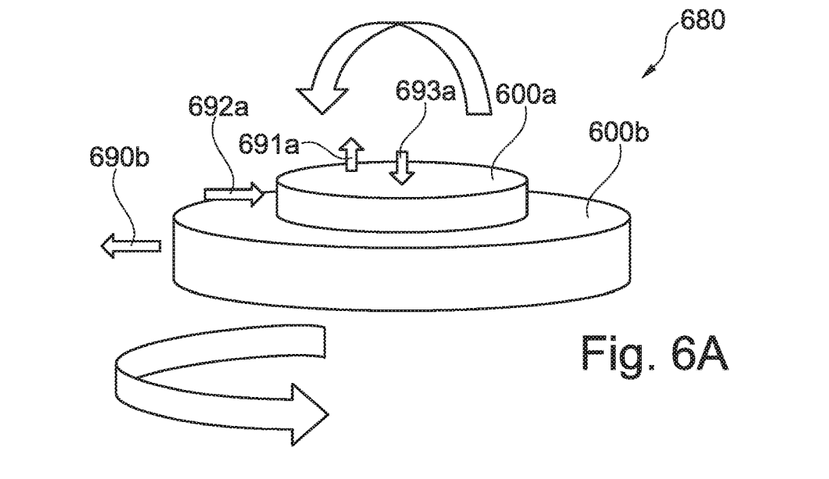
FIG. 6A shows a communication system comprising two electronic devices, which allow for receiving and transmitting electromagnetic radiation both in an in-plane direction and an out-of-plane direction.

FIG. 6A shows a communication system 680 comprising two electronic communication devices, a first electronic device 600a and a second electronic device 600b. According to the embodiment described here the two electronic devices are mechanically and/or electrically connected with each other and can be rotated together along two perpendicular directions by 360°. The corresponding rotational movements are illustrated in FIG. 6A with curved arrows.

As can be taken from the Figure, the first electronic communication device 600a is capable of (i) receiving electromagnetic radiation 692a from an in-plane direction and (ii) receiving electromagnetic radiation 693a from an out-of-plane direction. Further, the electronic communication device 600a is capable of transmitting electromagnetic radiation 691a along an out-of-plane direction. The second electronic communication device 600b is capable of transmitting electromagnetic radiation 690b along an in-plane direction.

It is obvious that with the two rotational degrees of freedom the communication system 680 is capable of (a) receiving electromagnetic radiation from all possible directions with a predominant directional characteristic and (b) transmitting electromagnetic radiation along all possible directions also with a predominant directional characteristic.

In a preferred embodiment of the communication system 680 the antenna structures and/or the radiation lenses are configured to cover the whole perimeter. Hence, the devices 600a and 600b can be built up with a PCB having preferably a round shape. In this preferred embodiment there is no need for providing any moving parts. One device/PCB may be used to receive electromagnetic radiation while the other device/PCB may be used to emit electromagnetic radiation. Thereby, the radiation signals can be transmitted and emitted via the side surface and/or via the main surface of the respective PCB.

Figure 6B:
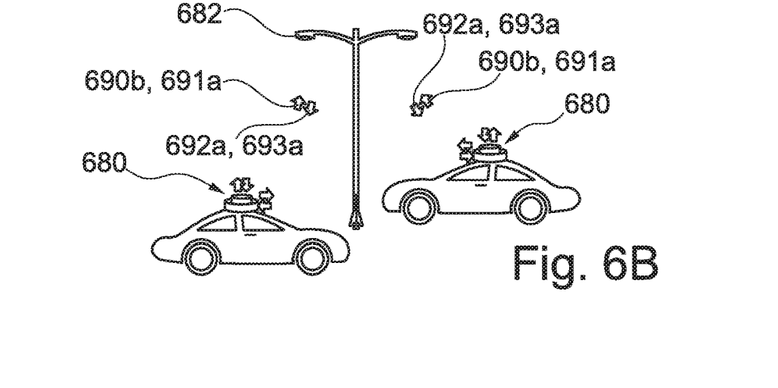
FIG. 6B shows an application for the communication system of FIG. 6A.

FIG. 6B shows an application for the communication system 680 of FIG. 6A. Each one of two cars is provided with such a communication system 680. Each one of the cars can communicate either with the other car or with a base station 682 having an antenna, which is mounted to the pole of a street light. By directing the predominant directional characteristic towards the respective communication partner (e.g. the other car or the base station 682) a good radio communication link can be established even with a comparatively small power being available in particular for transmitting the respective electromagnetic radiation.

The communication concept illustrated in FIG. 6B can be used for MIMO communication between "car to car" and/or between "car to base station". Any of the electronic devices of the communication systems can be used for a transfer of electromagnetic radiation between any applications as well as for electromagnetic energy harvesting or wireless energy beaming. For energy harvesting stray fields from communication antennas etc. could be used. Energy beaming can be used e.g. for wirelessly charging electronic apparatuses. Each one of the communication systems 680 can also be understood as components on top of autarkic systems (or any other application) harvesting waste energy from telecommunication antennas installed e.g. on poles.

It should be noted that the term "comprising" does not exclude other elements or steps and the articles "a" or "an" do not exclude a plurality. Also, elements described in association with different embodiments may be combined.

Implementation of the invention is not limited to the preferred embodiments shown in the figures and described above. Instead, a multiplicity of variants are possible which use the solutions shown and the principle according to the invention even in the case of fundamentally different embodiments.

LIST OF REFERENCE SIGNS 100 electronic (communication) device for transmitting electromagnetic radiation
110 component carrier
120 component
130 antenna structure
140 radiation lens
142 stacked rings
150 cavity
160 reflector
190 electromagnetic radiation (transmitted)
194 focal spot (outside from component carrier)
200 electronic (communication) device for receiving electromagnetic radiation
292 electromagnetic radiation (received)
296 focal spot (inside the component carrier)
300 electronic (communication) device for receiving electromagnetic radiation
310 component carrier
330 antenna structure
370 PCB device
372 electrically insulating layer
374 electrically conductive layer
376 electrical via connection
400 electronic (communication) device for transmitting electromagnetic radiation
410 component carrier
412 shielding layer
414 shielding layer
430 antenna structure
432 wiring structure
500 electronic (communication) device for receiving electromagnetic radiation
510 component carrier
530 antenna structure
550 cavity
570 PCB device
576 electrical via connection
600a first electronic (communication) device
600b second electronic (communication) device
680 communication system
682 base station
692a in-plane electromagnetic receive radiation (for first electronic device)
690b in-plane electromagnetic transmit radiation (from second electronic device)
691a out-of-plane electromagnetic transmit radiation (from first electronic device)
693a out-of-plane electromagnetic receive radiation (for first electronic device)

The invention claimed is:

1. An electronic device for transmitting electromagnetic radiation, the electronic device comprising:
a component carrier comprising a stack having at least one electrically insulating layer structure and at least one electrically conductive layer structure;
a component configured for providing an electric radio frequency signal;
an antenna structure formed in the component carrier and configured for emitting electromagnetic radiation in response to receiving the provided radio frequency signal; and
a radiation lens formed in the component carrier and configured for spatially manipulating the emitted electromagnetic radiation and directing the spatially manipulated emitted electromagnetic radiation to an environment of the component carrier,
wherein the radiation lens is realized with materials of different layers of the stack of the component carrier.

2. The electronic device as set forth in claim 1, wherein the radiation lens is configured for spatially concentrating the emitted electromagnetic radiation towards a focal spot being located outside from the component carrier.

3. The electronic device as set forth in claim 1, wherein the component, the antenna structure, and the radiation lens are formed within one and the same component carrier.

4. The electronic device as set forth in claim 1, wherein the radiation lens comprises a metamaterial.

5. The electronic device as set forth in claim 1, wherein the radiation lens comprises stacked rings made of an electrically conductive material, wherein in between two neighboring stacked rings there is provided a dielectric material.

6. The electronic device as set forth in claim 1, wherein within the component carrier there is formed a cavity which is located in a path of the electromagnetic radiation, which path extends between the antenna structure and the radiation lens.

7. The electronic device as set forth in claim 1, wherein the antenna structure is provided directly at the component.

8. The electronic device as set forth in claim 1, wherein the antenna structure is spatially separated from the component and is electrically connected via an electrically conductive wiring structure formed within the component carrier.

9. The electronic device as set forth in claim 1, wherein the electromagnetic radiation is transferred between the environment of the component carrier and the component carrier via a side surface of the component carrier, or
wherein the electromagnetic radiation is transferred between the environment of the component carrier and the component carrier via a main surface of the component carrier.

10. The electronic device as set forth in claim 1, further comprising:
a radiation reflector formed in the component carrier and configured for redirecting electromagnetic radiation propagating inside the component carrier.

11. An electronic device for receiving electromagnetic radiation, the electronic device comprising:
a component carrier comprising a stack having at least one electrically insulating layer structure and at least one electrically conductive layer structure;
a radiation lens formed in the component carrier and configured for spatially manipulating electromagnetic radiation originating from an environment of the component carrier, wherein the radiation lens is realized with materials of different layers of the stack of the component carrier;
an antenna structure formed in the component carrier and configured for receiving the spatially manipulated electromagnetic radiation and for providing an electric radio frequency signal in response to the received spatially manipulated electromagnetic radiation; and a component configured for receiving and processing the electric radio frequency signal.

12. The electronic device as set forth in claim 11, wherein the radiation lens is configured for spatially concentrating the electromagnetic radiation originating from the environment of the component carrier towards a focal spot being located inside of the component carrier.

13. The electronic device as set forth in claim 11, wherein the component, the antenna structure, and the radiation lens are formed within one and the same component carrier.

14. The electronic device as set forth in claim 11, wherein the radiation lens comprises stacked rings made of an electrically conductive material, wherein in between two neighboring stacked rings there is provided a dielectric material.

15. The electronic device as set forth in claim 11, wherein within the component carrier there is formed a cavity which is located in a path of the electromagnetic radiation, which path extends between the antenna structure and the radiation lens.

16. The electronic device as set forth in claim 11, further comprising:
a radiation reflector formed in the component carrier and configured for redirecting electromagnetic radiation propagating inside the component carrier.

17. An electronic apparatus, comprising:
(A) a first electronic device for transmitting electromagnetic radiation, the first electronic device comprising:
a component carrier comprising a stack having at least one electrically insulating layer structure and at least one electrically conductive layer structure;
a component configured for providing an electric radio frequency signal;
an antenna structure formed in the component carrier and configured for emitting electromagnetic radiation in response to receiving the provided radio frequency signal; and
a radiation lens formed in the component carrier and configured for spatially manipulating the emitted electromagnetic radiation and directing the spatially manipulated emitted electromagnetic radiation to an environment of the component carrier,
wherein the radiation lens is realized with materials of different layers of the stack of the component carrier; and
(B) a second electronic device for receiving electromagnetic radiation, the second electronic device comprising:
a component carrier comprising a stack having at least one electrically insulating layer structure and at least one electrically conductive layer structure;
a radiation lens formed in the component carrier and configured for spatially manipulating electromagnetic radiation originating from an environment of the component carrier,
wherein the radiation lens is realized with materials of different layers of the stack of the component carrier;
an antenna structure formed in the component carrier and configured for receiving the spatially manipulated electromagnetic radiation and for providing an electric radio frequency signal in response to the received spatially manipulated electromagnetic radiation; and
a component configured for receiving and processing the electric radio frequency signal.

18. An electronic device for transmitting electromagnetic radiation, the electronic device comprising:
a component carrier comprising a stack having at least one electrically insulating layer structure and at least one electrically conductive layer structure;
a component configured for providing an electric radio frequency signal;
an antenna structure formed in the component carrier and configured for emitting electromagnetic radiation in response to receiving the provided radio frequency signal; and
a radiation lens formed in the component carrier and configured for spatially manipulating the emitted electromagnetic radiation and directing the spatially manipulated emitted electromagnetic radiation to an environment of the component carrier;
wherein within the component carrier there is formed a cavity which is located in a path of the electromagnetic radiation, which path extends between the antenna structure and the radiation lens.

19. An electronic device for receiving electromagnetic radiation, the electronic device comprising:
a component carrier comprising a stack having at least one electrically insulating layer structure and at least one electrically conductive layer structure;
a radiation lens formed in the component carrier and configured for spatially manipulating electromagnetic radiation originating from an environment of the component carrier;
an antenna structure formed in the component carrier and configured for receiving the spatially manipulated electromagnetic radiation and for providing an electric radio frequency signal in response to the received spatially manipulated electromagnetic radiation; and
a component configured for receiving and processing the electric radio frequency signal;
wherein within the component carrier there is formed a cavity which is located in a path of the electromagnetic radiation, which path extends between the antenna structure and the radiation lens.

* * * * *